(12) United States Patent
MacLeod et al.

(10) Patent No.: US 6,373,655 B1
(45) Date of Patent: Apr. 16, 2002

(54) LOW COST HYDRODYNAMIC SPINDLE

(75) Inventors: Donald J. MacLeod; Hans Leuthold; Chris M. Woldemar, all of Santa Cruz, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/326,016

(22) Filed: Jun. 4, 1999

Related U.S. Application Data

(60) Provisional application No. 60/088,328, filed on Jun. 4, 1998.

(51) Int. Cl.[7] ............................................... G11B 17/02
(52) U.S. Cl. ..................................................... 360/99.08
(58) Field of Search ........................... 360/99.08, 98.07; 310/90

(56) References Cited

U.S. PATENT DOCUMENTS

| | | | |
|---|---|---|---|
| 5,089,732 A | * | 2/1992 | Konno et al. .................. 310/90 |
| 5,925,949 A | * | 7/1999 | Jung et al. ................ 360/99.08 |
| 5,969,448 A | * | 10/1999 | Liu et al. .................. 360/99.08 |

\* cited by examiner

*Primary Examiner*—Robert S. Tupper
(74) *Attorney, Agent, or Firm*—Moser, Patterson & Sheridan LLP

(57) ABSTRACT

A spindle drive for a rotating media for data storage in computer systems with a single piece base, the base having a sleeve for fixedly holding a rotating shaft through hydrodynamic bearings, the shaft further affixed to a hub for rotating the media, the base also having a drive assembly with a stator and permanent magnets.

16 Claims, 3 Drawing Sheets

LOW COST HYDRODYNAMIC SPINDLE

CROSS-REFERENCE TO RELATED APPLICATION

The present application claims priority to Provisional Application No. 60/088,328 filed Jun. 4, 1998 by MacLeod et al., which is incorporated herein by reference and the priority of which this application is claimed.

FIELD

This invention relates to data storage media drives used in computer systems, and more particularly to spindles used in the rotation of data storage media drives.

BACKGROUND

The high speeds and accuracy obtainable with rotating storage media, especially flat storage media such as disks, has made spindle drives the most common method for implementing storage media drives. At the same time, the rapidly developing field of hydrodynamic bearings has made it possible to realize ever faster, more reliable, and lower cost spindle drives.

However, hydrodynamic bearings, which are becoming the universal bearing type used in spindle drives, require hard bearing faces between the race or sleeve and the bearing or shaft. This is due to the fact that noncontact of the shaft and sleeve cannot be guaranteed in all cases, such as at startup or for unexpected power failures.

As a consequence of the possibility of contact, the shaft and the sleeve are made of a hard material. Being hard, it is also expensive to process. Most of the parts of a drive are therefore made of lower cost, more easily processed materials such as aluminum, but the things that make the aluminum desirable; softness, ease with which it can be "worked", etc., are those things that make it an impractical shaft-sleeve contact material. As a consequence, the base area of a drive is comprised of two major pieces, a sleeve for the shaft which is a hard material such as steel or ceramic, and a base which is a lower cost material such as aluminum.

There are other reasons that the shaft may need to be made entirely of a hard material, reasons not relevant here; but the same reasons do not apply to the sleeve. Even so, the possibility of contact has caused the industry to universally opt for a hard sleeve.

A possible problem with a hard sleeve is that hard materials are generally heavier than relatively soft materials such as aluminum. As a result, with hard shocks, such as dropping a drive, there is more mass to apply force to the spindle, and therefore a greater risk of damage. Since ruggedness is a great concern for drives, this can be important.

These and other concerns have caused the inventors to develop the invention disclosed below.

SUMMARY

A single piece base and sleeve is made of a low cost material such as aluminum. At this time, the shape is similar to the shape of a prior art sleeve and base made separately and joined, but since only one piece is now used there will be other shapes available that may provide significant advantages, such as a better form factor, etc., or the improved thermal conductivity of some low cost solutions such as aluminum may provide other advantages as speeds increase.

A hard bearing surface is provided, such as a steel or ceramic liner proximal the shaft, or sputtered, plated, or deposited wear resistant coatings on the base surface such as rhodium or similar materials on the bearing surfaces. Hard anodize of the aluminum may also be appropriate in some cases. A harder surface than was previously practical may be achieved, since less material will be needed.

In the case of a liner for hydrodynamic bearing technology, the grooves required may be more easily realized, since the material is more easily handled and there is less to be worked.

Because aluminum is much lighter than, for example, steel or ceramic, the survivability of a drive from a trauma is improved; since there will be less mass to create impact forces.

BRIEF DESCRIPTION

DETAILED DESCRIPTION

Because rotating media is becoming ever more pervasive, with performance and reliability requirements increasing rapidly, containing costs has become a paramount concern. Providing improvements while decreasing costs has proven extremely difficult. One way of meeting these expectations is to decrease the parts count; another is to decrease weight. The present invention does both.

Figure 1:
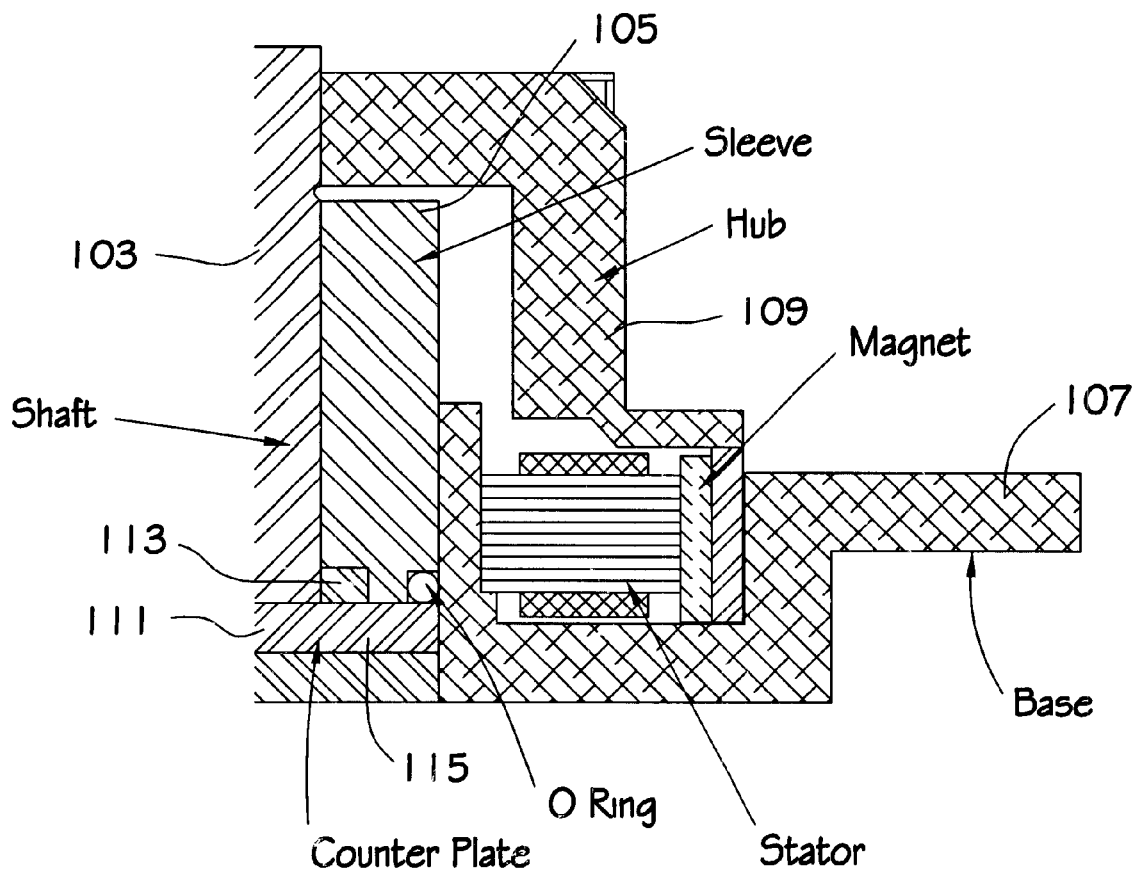
FIG. 1 is an embodiment of the prior art showing a partial section of a spindle drive.

In an embodiment of the prior art 100 shown in FIG. 1, a partial section of a spindle drive of the type addressed by this invention is shown. A hydrodynamic bearing surface exists between the shaft 103 and the sleeve 105, and due to the potential for contact between them, both are a hard material such as steel or ceramic.

Sleeve 105 is fixedly mounted to base 107, which, for reasons of weight and cost is some easily worked relatively soft material such as aluminum. A hub 109 is fixedly connected to the rotating shaft 103. A fixed counter plate 111, a rotating thrust plate 113, and an o-ring 115 complete the major parts involved in maintaining rotation, where the thrust plate 113 generates an axial thrust between the counter plate 111 and the sleeve 105, and the o-ring 115 seals the interface between the counter plate 111 and sleeve 105.

Figure 2:
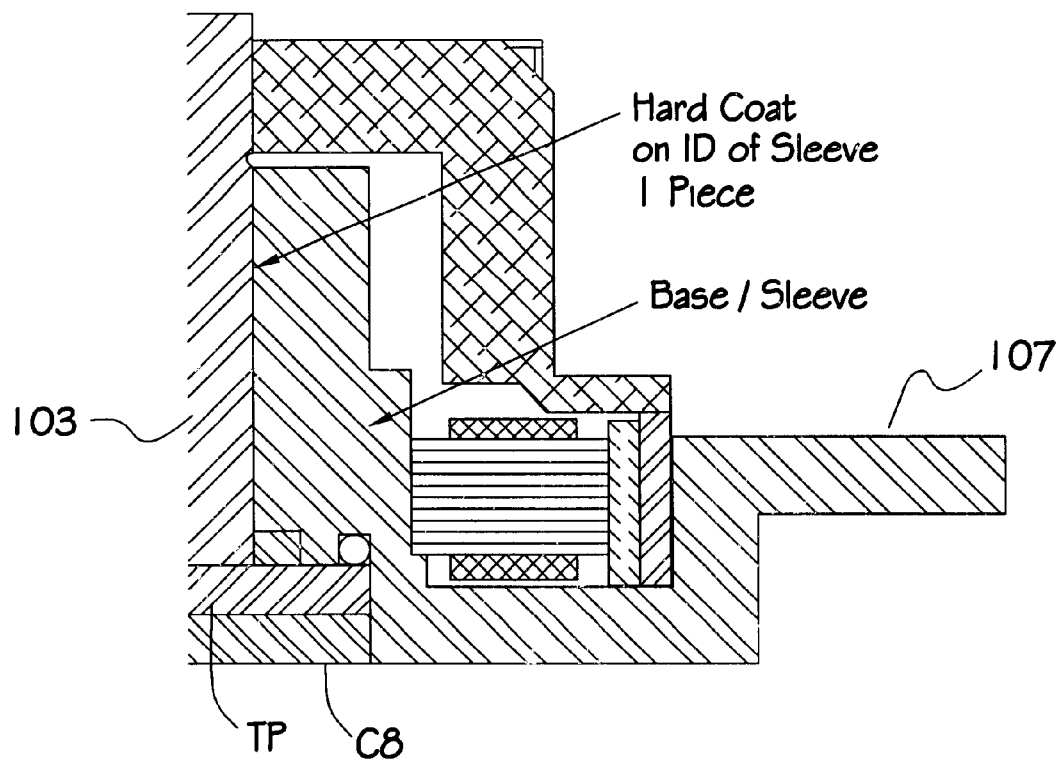
FIG. 2 is an embodiment of the invention showing a partial section of a spindle drive.

In an embodiment of the invention 200 shown in FIG. 2, sleeve 105 no longer exists, now being a part of base 107. Since base 107 is a soft material unsuited for a bearing surface, a hard coating of material has been introduced onto the bearing surface of base 107, including the surface proximal thrust plate 113. This coating is provided by processes from the group created by steps including hard anodization, deposited materials, plated materials, sputtered materials, or materials formed by methods providing a hardened surface.

Figure 3:
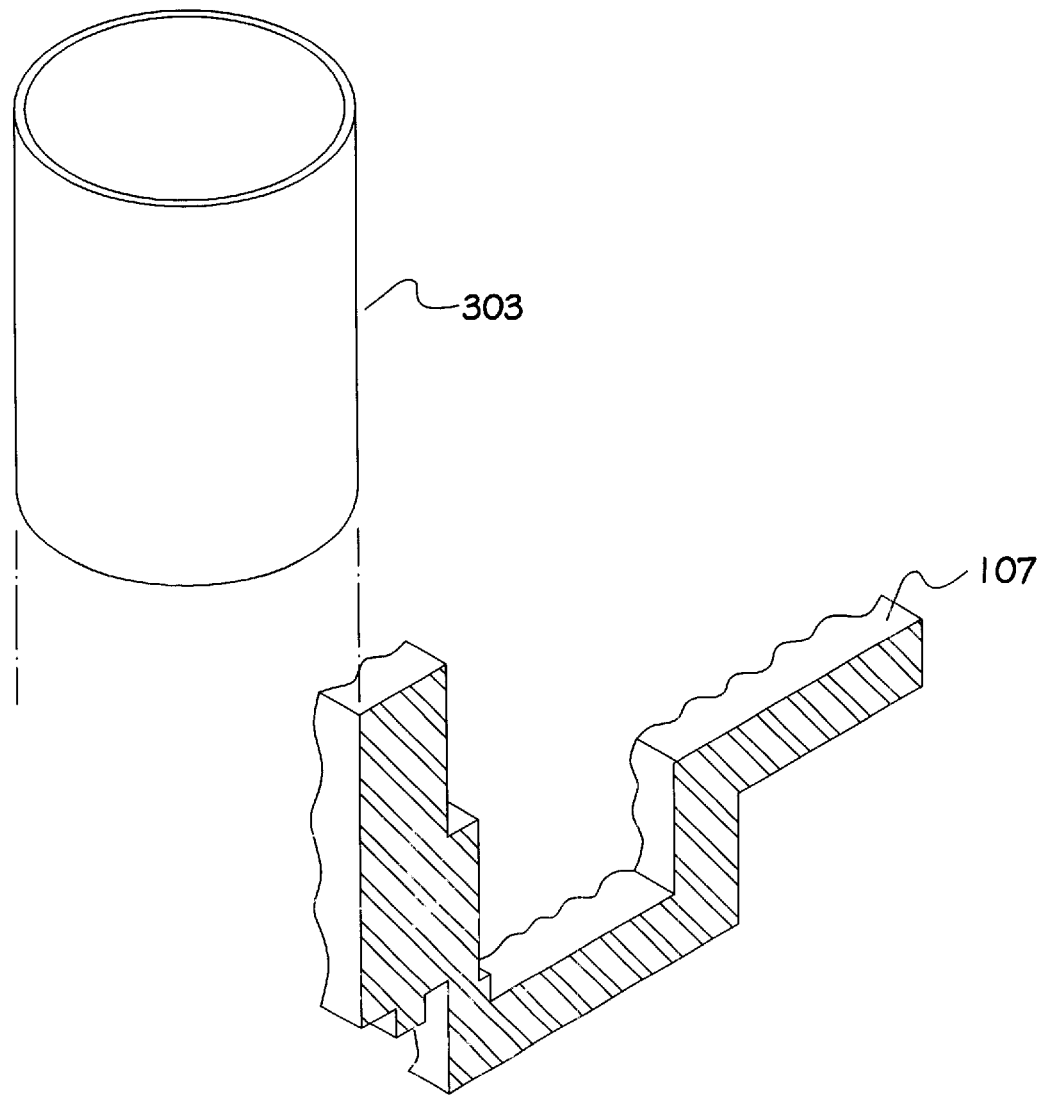
FIG. 3 is an embodiment of the invention showing a perspective section of a spindle drive, and a liner for insertion therein.

In another embodiment of the invention 300 shown in FIG. 3, a liner 303 of a hard material is introduced into the base 107, such as with a press fit. The liner 303 serves the same function as the sleeve 105 of the prior art, but is much lighter and less expensive, as well as providing for the use of hard but expensive materials that were impractical in sleeve 105 because of the size and weight of sleeve 105, and might be impractical for addition by depositing, plating, and so forth. Note that liner 303 need be only thick and heavy enough for handling such as being inserted into base 107, and can potentially be a very thin and light, and therefore inexpensive, addition to the base 107.

We claim:

1. A spindle motor comprising a rotatable shaft supporting a hub for supporting a rotating disc media for data storage in a computer system comprising:

a single piece base of aluminum having an axial extending sleeve having inner and outer surfaces, the sleeve inner surface defining a first axial extending opening wherein the shaft is located the inner surface of the sleeve cooperating with an outer surface of the rotatable shaft to define a hydrodynamic bearing supporting the shaft for rotation;

said rotating shaft affixed to a hub for supporting said disc media;

the rotating shaft having a thrust plate at an end thereof opposite from the hub and rotating over a counterplate supported in a second opening in the base, the single piece base and sleeve including a surface facing a surface of the thrust plate, the first and second openings together defining an axial opening extending entirely through the single piece base having an axial extending sleeve, said motor also comprising a drive assembly including a stator supported from the base and a permanent magnet supported from the hub and aligned with the stator, energization of the stator causing rotation of the hub.

2. The spindle motor of claim 1 comprising:

said base having a hard coating on the surface of the sleeve proximal said rotating shaft.

3. The spindle motor of claim 2 comprising:

said hard coating being deposited on said surface.

4. The spindle motor of claim 2 comprising:

said hard coating being sputtered on said surface.

5. The spindle motor of claim 2 comprising:

said hard coating being plated on said surface.

6. The spindle motor of claim 1 comprising:

said sleeve and base and further comprising a liner of a hard material proximal said rotating shaft.

7. The spindle motor of claim 2 wherein one of the shaft and sleeves have grooves therein to form the hydrodynamic bearing.

8. The spindle motor of claim 7 wherein the base and sleeve are formed of aluminum.

9. The spindle motor of claim 6 wherein the liner is press fit within the sleeve facing the rotating shaft across a gap of the hydrodynamic bearing.

10. A spindle motor for supporting a rotating disc media for data storage in a computer system, comprising a single piece base and sleeve of aluminum comprising means for defining a hydrodynamic bearing for directly supporting a shaft for rotation within the sleeve.

11. A single piece base and sleeve for use in an axially extending sleeve for supporting a rotating shaft by defining an axial opening for the shaft, the shaft and sleeve cooperating to form a hydrodynamic bearing;

the base also defining an opening for a counterplate adjacent a thrust plate supported from an end of the shaft, the single piece comprising aluminum with the inner surface of the sleeve comprising a relatively harder material than aluminum.

12. The spindle drive of claim 11 comprising:

said base having a hard coating on the surface of said sleeve proximal said rotating shaft.

13. The spindle drive of claim 12 comprising:

said hard coating being deposited on said surface.

14. The spindle drive of claim 12 comprising:

said hard coating being sputtered on said surface.

15. The spindle drive of claim 12 comprising:

said hard coating being plated on said surface.

16. The spindle drive of claim 1 comprising:

said base having a liner of a hard bearing material inside said sleeve and proximal said rotating shaft.

\* \* \* \* \*